June 19, 1962   D. L. BENTSEN   3,039,628
TANK LIFT

Filed Oct. 16, 1958   2 Sheets-Sheet 1

Donald L. Bentsen
INVENTOR.

BY

ATTORNEY

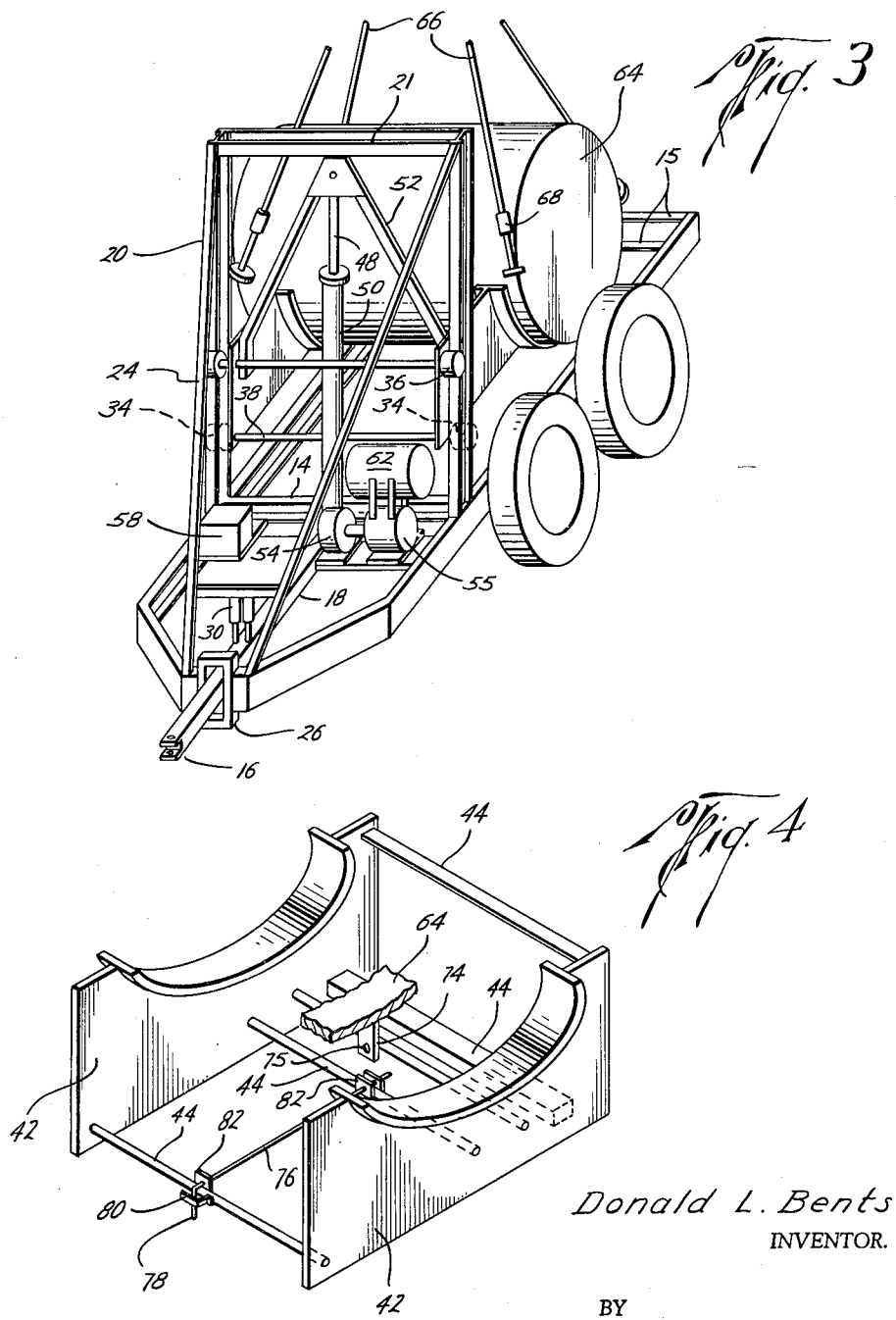

3,039,628
TANK LIFT
Donald L. Bentsen, % Tide L.P.G., Edinburg, Tex.
Filed Oct. 16, 1958, Ser. No. 767,691
2 Claims. (Cl. 214—75)

This invention pertains to the transportation and handling of fluid containers. More particularly, the invention pertains to the transportation, handling and moving of cylindrical tanks of moderate size. The tanks are of sizes contemplated for use as containers for agricultural liquids such as liquid fertilizer and fuel for farm machinery. The invention is especially applicable in certain irrigated agricultural areas where large amounts of liquid fertilizer are seasonably applied, during which comparatively short season large quantities of such liquids must be distributed in relatively small containers to hundreds of individual farms.

There are several devices now in use for the handling of the subject tanks. However, all of the known, self-powered devices are constructed in combination with a truck chassis and are extremely expensive.

Another disadvantage of the conventional devices is that the expense thereof severely limits the number in use and makes it necessary that they be purchased and owned by the seller of liquids. This situation results in inadequate distribution of the agricultural liquids during periods of peak demand.

Another disadvantage of the conventional device is its great weight, resulting in lack of mobility when it is desirable to move the tanks into the cultivated fields.

Another disadvantage of the conventional device is that because of its expense and the number of individuals it must serve, some of the farmers using the liquid fertilizer must suffer expensive delay in waiting for delivery or for one of the seller's units to move the tanks from one field to another.

Another disadvantage of the conventional device is the inability of the truck-mounted unit to cross lightly constructed private cattle guards and bridges while carrying a heavy load. Also, the axle loads of the truck-mounted device are greater than is desirable on temporary dirt roads used during the soil preparation periods.

An object of the invention is to provide handling and transporting means for fluid containers which are economical in construction and operation.

Another object of the invention is to provide tank handling means that may be loaned to and operated by individual purchasers of liquids.

Another object of the invention is to provide tank handling and transporting means which may be moved across temporary dirt roads and lightly constructed temporary bridges and cattle guards.

Another object of the invention is to provide light, portable tank transporting devices which have integral power means for lifting and lowering the tanks.

Another object of the invention is to provide means for highway transportation of liquid containers that has a low center of gravity when loaded and has means for fixedly securing such containers during transport.

A further advantage of the device is in the economy of construction and operation. The invention makes unnecessary the use of an expensive truck chassis and driver.

Another advantage of the invention is that the individual purchaser of liquid fertilizer and vehicle fuel has independent means of transporting and handling the tanks, making him independent of the seller's facilities.

Another advantage is the light total weight and wheel loading of the device which makes it possible to move the loaded fertilizer and fuel tanks over soft dirt roads, temporary bridges and cattle guards.

Another advantage of the device is that it lowers the center of gravity of the tank-transporting vehicle to a safe point for high speed on the public highways.

Another advantage of the device is that the tank-lifting and placement device may be operated by only one person.

Another advantage of the device is that the weather-resistant finish of the tanks is not marred by the use of conventional hold-down devices such as chains or cables.

Briefly, the invention comprises a light, wheeled structure adapted to carry a bulky and heavy load normally necessitating the use of a truck, but which is adapted to be towed behind an automobile or other light vehicle. The device is adapted to handle at least one tank of the usual size used for agricultural chemicals and fuels. The device is adapted to raise and lower the tanks as well as transport them to locations inaccessible to ordinary heavy trucks. The invention has its own motive power for such raising and lowering operation in the form of wet cell batteries furnishing energy for an electrically-driven hydraulic pump which, in combination with a vertically movable cradle device, provides means for raising and lowering the tanks. The tanks must be raised in order to obtain gravity flow of the materials carried therein, and are usually held in such position by insertable legs after they have been raised to a given height. Removal of the tanks necessitates raising them slightly above their fixed position so that the legs may be removed. The tanks are then lowered to the lower or transport position and the device may then be towed away for refilling or for use in other places. A downwardly disposed flange, in combination with a lockable, sliding rod device, secures the tanks.

Other objects and advantages of the invention will appear from the following description of the preferred embodiment thereof, reference being made to the accompanying drawings wherein:

FIGURE 3 is a partly perspective, partly schematic view of the device from the forward point thereof.

FIGURE 4 is a partly perspective, partly schematic view of the tank-securing means employed in the preferred embodiment and the tank cradle.

Figure 1:
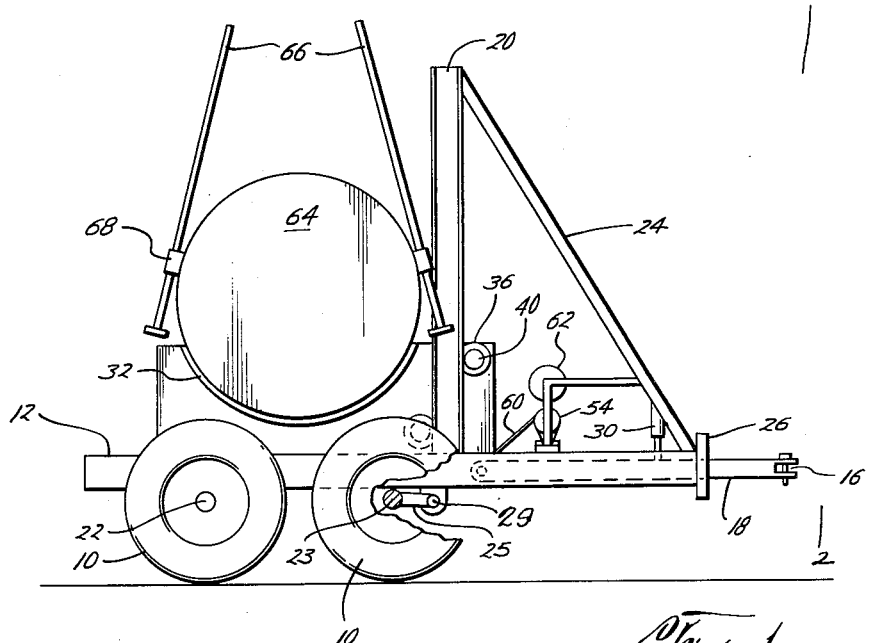
FIGURE 1 is a partly schematic, partly elevational view of the preferred embodiment of the invention.

Referring now to FIGURES 1 and 3 (see also FIGURE 2), the wheels 10 are mounted on horizontal frame side members 12 having front and rear cross-members 14 and 15 respectively therebetween. A trailer hitch 16 of any known type is attached to the forward end of tongue 18. Vertical frame members 20, having an upper crosspiece 21, are attached to and disposed at a right angle to the horizontal members 12 at a point slightly forward of the front axle 22 which, together with rear axle 23, are mounted on spring trailing arms 25 which are attached to torsion bar springs 29. Angled braces 24 run from the top of each vertical member to a hollow rectangular collar 26 disposed between the forward ends of the angled portions 28 of the horizontal frame members 14. Shock absorbers 30 are mounted on braces 24 and control the movement of the tongue 18 which passes through and is located by collar 26. Tank cradle 32 is shown disposed at the lower end of its travel resting upon the horizontal frame 12. The cradle has lower rear flanged wheels 34 and upper forward flanged wheels 36 bearing against the front and rear surfaces of the vertical frame 20 respectively, which flanged wheels are mounted on axles 38 and 40, respectively, running through the forward end of the cradle structure 32.

Figure 2:
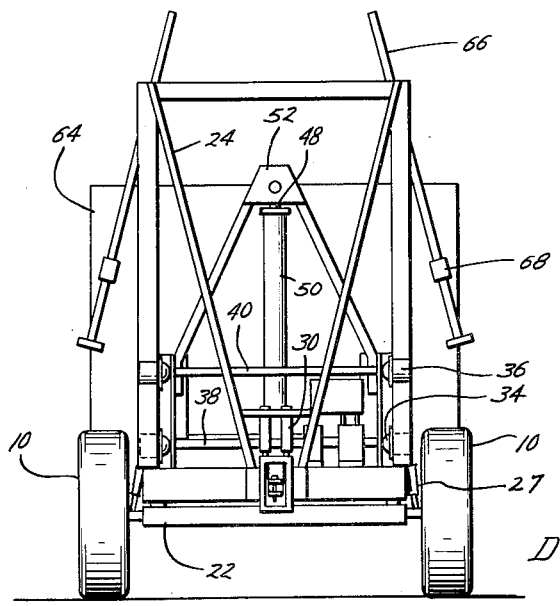
FIGURE 2 is a partly schematic, partly elevational view of the device taken on a plane 2—2.

Referring now to FIGURES 2 and 4, the cradle structure 32 comprises the two end pieces 42 and the lateral connecting braces 44 together with axle 38 and 40 upon which are mounted sets of flanged wheels 34 and 36. A hydraulic ram structure is disposed in the center of the vertical frame 20 and rests upon a cross-member 14 of the horizontal frame structure 12. The ram structure comprises piston rod 48 and hydraulic cylinder 50 which is attached to cross-member 14. Rod 48 is attached to A-frame 52 which is in turn attached to cradle structure 32.

Referring also to FIGURES 1 and 4, hydraulic pump 54 driven by electrical motor 56, which receives its energy from wet storage cells 58, forces fluid into hydraulic cylinder 50 through hydraulic pressure lines 60. Oil storage tank 62 provides a reservoir of hydraulic fluid to replace that lost by leakage and to receive return oil when piston rod 48 is lowered into hydraulic cylinder 50.

Referring now to FIGURE 3, the tongue 18 is shown disposed in collar 26 between the angled ends 28 of horizontal frame members 12. The rear end of tongue 18 is flexibly attached to cross-member 14 of the horizontal frame structure.

In operation, a tank 64 is loaded on the cradle structure 32 at the warehouse. Trailer hitch 16 is attached to the rear of any normal size vehicle such as an automobile or light truck. This is possible because the relative movement of tongue 18 in yoke 26 controlled by shock absorbers 30 allows the comparatively light vehicle to controllably tow the heavy load borne by the device at highway speeds or at slower speeds over rough terrain. Upon arrival at the location where the fuel or liquid fertilizer is to be used, the device is left attached to the vehicle and the operator simply turns on the switch to motor 55 which builds up hydraulic pressure by means of pump 54 and actuates hydraulic cylinder 50 to raise the cradle structure to any desired height. Flanged wheels 34 and 36 operating on vertical structure 20 determine the movement of the cradle under the heavy load of the full tank 64. Once in position, temporary legs 66 are slipped into sockets 68 which are welded to tank 64. The hydraulic pressure in hydraulic cylinder 50 is relieved by valve 70 returning hydraulic fluid to tank 62 and allowing the cradle 32 to slowly return to its transporting position at the bottom of vertical frame 20, resting on horizontal frame 12. The tank may be picked up and moved by reversing the process.

The tank 64 is held in place on cradle 32 by means of a flange 74 welded to the bottom of tank 64, which flange has a hole 75 therein. A rod 76 slidably mounted in vertical holders 82 is adapted to engage hole 75 when flange 74 is disposed therebetween. Rod 76 is locked by turning handle 78 down inside bracket 80.

While a preferred embodiment has been described herein, many modifications thereof may be made by a person skilled in the art without departing from the spirit of the invention, and it is intended to protect by Letters Patent all forms of the invention falling within the scope of the following claims.

I claim:

1. In the transporting of large fluid containers at high speeds over roads and at lower speeds over rough terrain, and the loading and unloading thereof, the combination of lightweight cradle means for supporting said fluid containers, means for securing said fluid containers to said cradle means, a frame means upon which said cradle means is mounted, self contained power means for raising and lowering said cradle means to positions for stationary emplacement and fast transport thereof respectively, multiple wheel and axle means, and means for stabilizing said means at high speed and under heavy loads comprising means for flexibly suspending said frame means upon at least one pair of said multiple wheel and axle means located forward of said cradle means and upon at least one pair of said multiple wheel and axle means located rearward of said cradle means independently of said forward located pair of said multiple wheel and axle means; and means for connecting said frame means with a towing vehicle and isolating said towing vehicle from the vertical and horizontal oscillations of aforesaid means during transport of said fluid containers, said frame means comprising a horizontal frame and a forward mounted vertical rectangular frame attached thereto; said cradle means comprising at least one horizontal member adapted to hold said containers, which cradle is slidably attached to said vertical frame and adapted to move from the top to the bottom thereof or vice versa, said means for securing said containers comprising a flange depending from said fluid container having an opening therethrough and a rod means slidably disposed in said horizontal frame adapted to pass through said opening in said flange and means for locking said rod in said engaged position; said self contained power means comprising at least one electric storage cell, an electric motor, pump and hydraulic ram, one end of which ram is attached to said horizontal frame and the other to said vertically movable cradle; said means for flexibly suspending said frame means upon said wheel means comprising at least two wheel and axle sets mounted in tandem, said wheel means being mounted on trailing arm extensions of said axle means and resilient means attached to each of said axle and wheel means supporting said frame and cradle means on each of said axle and wheel sets independently of each other; and said means for isolating a towing vehicle from the vertical and horizontal oscillations of aforesaid means comprising a flexibly mounted tongue member having limited vertical and horizontal movement, and shock absorbing means for damping such movement.

2. The combination of claim 1 wherein said horizontal frame means comprises at least two parallel side members, at least one cross member normal to said side members and disposed therebetween; and wherein said horizontal member of said cradle means comprises at least two vertical plates having concave, semicircular cutouts in the upper halves thereof and a vertically disposed A-frame attached to the forward end thereof; and wherein said vertical frame comprises at least two vertical parallel members and at least one cross member therebetween, each of which vertical frame members is attached to said horizontal frame; and wherein said hydraulic ram comprises a pivotally mounted, vertically oriented hydraulic cylinder, a movable piston disposed therein, a rod connecting said movable piston with said A-frame, and means communicating between the bore of said cylinder and said hydraulic pump whereby the application of fluid pressure to said movable piston causes said cradle to be lifted; and wherein said means for attaching said frame to a towing vehicle and isolating said towing vehicle from the vertical and horizontal oscillation of aforesaid means, and the load carried thereby, comprises a forward frame structure attached to the forward end of said horizontal frame braced to said vertical frame, which forward frame structure has a vertically disposed rectangular collar mounted on the forwardmost portion thereof and a horizontal tongue member flexibly attached to said cross member of said horizontal frame which tongue extends forward from said cross member through said collar and terminates with any known hitching means, the lateral and vertical movements of which tongue are limited by the inner surfaces of said collar, and the vertical oscillations of which are damped by shock absorbing means attached to said tongue and to said forward frame structure.

References Cited in the file of this patent
UNITED STATES PATENTS

| | | |
|---|---|---|
| 1,365,013 | Wright | Jan. 11, 1921 |
| 2,517,304 | Greening | Aug. 1, 1950 |
| 2,803,363 | Hutchinson | Aug. 20, 1957 |
| 2,812,873 | Coleman | Nov. 12, 1957 |